UNITED STATES PATENT OFFICE.

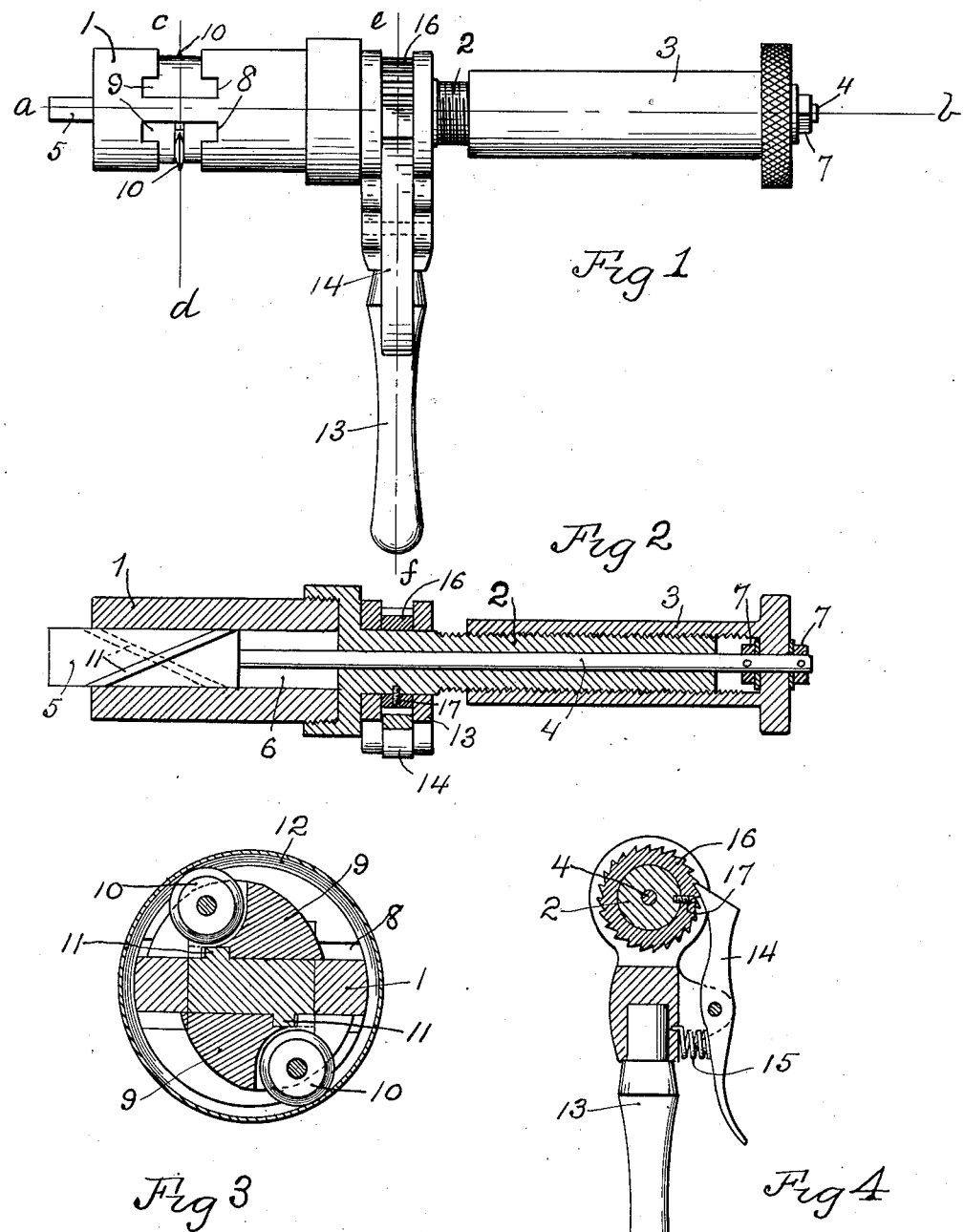

HENRY L. RENNER, OF PAOLA, KANSAS.

BOILER-TUBE-CUTTING TOOL.

1,095,229. Specification of Letters Patent. Patented May 5, 1914.

Application filed August 30, 1912. Serial No. 717,869.

*To all whom it may concern:*

Be it known that I, HENRY L. RENNER, a citizen of the United States, residing at Paola, in the county of Miami and State of Kansas, have invented a certain new and useful Improvement in Boiler-Tube-Cutting Tools, of which the following is a specification.

My invention relates to improvements in boiler tube cutting tools.

The object of my invention is to provide a simple, efficient, and easily operable tool for transversely cutting boiler tubes so that they may be readily removed from the boiler.

In the accompanying drawing, which illustrates the preferred form of my invention, Figure 1 is a side elevation of the tool. Fig. 2 is a horizontal section on the line *a—b* of Fig. 1. Fig. 3 is a cross section on the line *c—d* of Fig. 1. Fig. 4 is a cross section on the line *e—f* of Fig. 1.

Similar reference characters designate similar parts in the different figures.

The tool is provided with a head 1, which is preferably cylindrical and has its rear end externally screw threaded and fitted to the forward end of a shank 2, having a screw threaded rear end on which is fitted a rotary sleeve 3, having a closed rear end provided with an axial bore in which is rotatively mounted the shank 4 of a longitudinally movable wedge member, having a rectangular head 5, which is longitudinally slidably fitted in a longitudinal bore 6, which extends axially through the head 1. The shank 2 is provided with an axial bore through which extends the slidable shank 4. Two collars 7, are secured to the shank 4, at opposite sides of the closed end of the sleeve 3. The periphery of the head 1 is provided at opposite sides of the head 5, with T-shaped transverse grooves 8, in which are respectively slidably mounted two cutter carriers 9, on which are respectively rotatively mounted two rotary disk cutters 10, which are adapted to be moved simultaneously in opposite directions to different positions beyond the periphery of the head 1. Opposite sides of the head 5 are provided with rib projections 11, disposed obliquely to the axis of the head 1 and which are respectively slidably mounted in correspondingly disposed grooves which are provided in the adjacent sides of the carriers 9.

The head 1 is adapted to be inserted in a boiler tube 12, shown in Fig. 3. It will be understood that by rotating the sleeve 3 in opposite directions on the shank 2, the shank 4 and head 5 will be alternately moved forwardly and backwardly, thereby, through the intermediacy of the rib projections 11, causing the carriers 9, together with the cutters 10, to be moved inwardly and outwardly.

For the purpose of turning the head 1 on its axis after each adjustment outwardly of the cutters 10, as above described, I provide the following preferred mechanism: Pivotally mounted on the shank 2, is the bifurcated end of a handle 13, to which is pivoted a pawl 14, which is normally held by means of a coil spring 15, engaged with the teeth of a ratchet wheel 16, which is located between the arms of a bifurcated end of the handle 13, and which is secured to the shank 2 by any means, as for example, by means of a screw 17. It will be readily understood that by oscillating the handle 13, the shank 2 and head 1 may be rotated on their axis.

In operating my invention, the sleeve 3 is turned so as to inwardly retract the cutters 10 to positions in which the head 1 and said cutters may be inserted into the tube which is to be cut. After such insertion of the head the sleeve 3 is turned in a direction such that the carriers 9 will be forced outwardly by the rib projections 11 until the cutters 10 bear tightly against the inner side of the boiler tube 12, which is to be transversely cut in two. The handle 13 is then oscillated, so as to rotate the head 1 on its axis, thus causing the cutters 10, which are provided with hardened, sharp edges, to cut an annular groove on the interior of the tube 12. The sleeve 3 is then again turned so as to tightly force the cutters 10 against the tube 12, after which the handle 13 is again oscillated, thereby causing the cutters to cut still further through the tube 12. These operations are repeated until the tube 12 has been severed, upon which the sleeve 3 is turned so as to retract the cutters 10, to positions which permit the withdrawal of the tool.

I do not limit my invention to the structure illustrated and described, as modifications, within the scope of the appended claims, may be made without departing from the spirit of my invention.

Having thus described my invention, what I claim and desire to secure by Letters Patent, is:—

1. A boiler tube cutting tool provided with a head having a transverse peripheral T shaped groove, a carrier slidably fitted in said groove, a cutter carried by the carrier, means for sliding the carrier to different positions, and means for rotating the head.

2. A boiler tube cutting tool provided with a head having at opposite sides two transverse peripheral T shaped parallel grooves, two carriers slidably fitted respectively in said grooves two cutters carried respectively by said carriers, means for sliding said carriers, and means for rotating said head.

In testimony whereof I have signed my name to this specification in presence of two subscribing witnesses.

HENRY L. RENNER.

Witnesses:
JAKE REUSCH,
JOSEPH B. DAKMAN.

Copies of this patent may be obtained for five cents each, by addressing the "Commissioner of Patents. Washington, D. C."